(12) United States Patent
Luan et al.

(10) Patent No.: US 12,228,476 B2
(45) Date of Patent: Feb. 18, 2025

(54) FAULT SIGNAL LOCATING AND IDENTIFYING METHOD OF INDUSTRIAL EQUIPMENT BASED ON MICROPHONE ARRAY

(71) Applicant: Northeastern University, Shenyang (CN)

(72) Inventors: Feng Luan, Shenyang (CN); Xu Li, Shenyang (CN); Ziming Zhang, Shenyang (CN); Yan Wu, Shenyang (CN); Yuejiao Han, Shenyang (CN); Dianhua Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 434 days.

(21) Appl. No.: 17/781,475

(22) PCT Filed: Jul. 29, 2021

(86) PCT No.: PCT/CN2021/109200
§ 371 (c)(1),
(2) Date: Jun. 1, 2022

(87) PCT Pub. No.: WO2022/116570
PCT Pub. Date: Jun. 9, 2022

(65) Prior Publication Data
US 2023/0152187 A1    May 18, 2023

(30) Foreign Application Priority Data
Dec. 4, 2020  (CN) .......................... 202011416944.9

(51) Int. Cl.
*G01M 99/00*    (2011.01)
*G01H 17/00*    (2006.01)
(Continued)

(52) U.S. Cl.
CPC .......... *G01M 99/005* (2013.01); *G06N 3/044* (2023.01); *G06N 3/045* (2023.01); *G06N 3/0464* (2023.01); *G06N 3/08* (2013.01); *H04R 1/406* (2013.01)

(58) Field of Classification Search
CPC ....... G01M 99/005; G01M 7/00; G06F 18/24; G06F 18/20; G01H 17/00; G01H 3/08;
(Continued)

(56) References Cited

U.S. PATENT DOCUMENTS

| 11,646,009 B1 * | 5/2023 | Chhetri | .................. G10L 15/16 704/232 |
| 11,735,156 B1 * | 8/2023 | Trueba | .................. G10L 13/033 704/200 |

(Continued)

FOREIGN PATENT DOCUMENTS

| CN | 107154037 A | | 9/2017 | |
| CN | 111160167 A | * | 5/2020 | ............. G06N 3/045 |
| CN | 112560913 A | | 3/2021 | |

*Primary Examiner* — Jeffrey P Aiello
(74) *Attorney, Agent, or Firm* — Muncy, Geissler, Olds & Lowe, P.C.

(57) ABSTRACT

Provided is a fault signal locating and identifying method of industrial equipment based on a microphone array. The method includes the steps of: acquiring sound signals and dividing the acquired signals into a training set, a verifying set and a test set; performing feature extraction on the sound signals in the training set, and extracting a phase spectrogram and an amplitude spectrogram of a spectrogram; sending an output of a feature extraction module, as an input, to a CNN, and in each layer of the CNN, learning a translation invariance in the spectrogram by using a 2D CNN; in between the layers of the CNN, normalizing the output by using a batch normalization, and reducing a dimension by using a maximum pooling layer along a frequency axis; sending an output from the layers of the (Continued)

CNN to layers of RNN; using a linear activation function; and inputting an output of a full connection layer to two parallel full connection layer branches for fault identification and fault location, respectively.

5 Claims, 7 Drawing Sheets

(51) Int. Cl.
<table>
<tr><td>G06F 18/2131</td><td>(2023.01)</td></tr>
<tr><td>G06F 18/24</td><td>(2023.01)</td></tr>
<tr><td>G06N 3/04</td><td>(2023.01)</td></tr>
<tr><td>G06N 3/044</td><td>(2023.01)</td></tr>
<tr><td>G06N 3/045</td><td>(2023.01)</td></tr>
<tr><td>G06N 3/0464</td><td>(2023.01)</td></tr>
<tr><td>G06N 3/08</td><td>(2023.01)</td></tr>
<tr><td>H04R 1/40</td><td>(2006.01)</td></tr>
</table>

(58) Field of Classification Search
CPC ............ G01H 3/06; G01H 3/04; G06N 3/044; G06N 3/0442; G06N 3/045; G06N 3/0464; G06N 3/08; G06N 3/088; G06N 3/048; H04R 1/406
USPC .................. 73/587, 40.5 A, 1.82; 178/18.04; 340/540; 700/169, 9; 702/189, 190, 185, 702/184, 183, 182, 59, 75, 79, 39, 56, 702/104, 150, 188, 152, 66, 42, 85
See application file for complete search history.

(56) References Cited

U.S. PATENT DOCUMENTS

<table>
<tr><td>11,854,564 B1*</td><td>12/2023</td><td>Chatlani</td><td>G10L 15/16</td></tr>
<tr><td>12,002,458 B1*</td><td>6/2024</td><td>Gao</td><td>G10L 15/22</td></tr>
<tr><td>2020/0371491 A1*</td><td>11/2020</td><td>Wong</td><td>G05B 13/027</td></tr>
<tr><td>2022/0093078 A1*</td><td>3/2022</td><td>Diriye</td><td>G10L 13/033</td></tr>
</table>

* cited by examiner

FAULT SIGNAL LOCATING AND IDENTIFYING METHOD OF INDUSTRIAL EQUIPMENT BASED ON MICROPHONE ARRAY

BACKGROUND OF THE INVENTION

1. Field of the Invention

The invention relates to fault signal locating and identifying techniques of industrial equipment, in particular to a fault signal locating and identifying method of industrial equipment based on a microphone array.

2. The Prior Arts

With the increasing degree of modern automation and the rapid development of science and technology, all walks of life are increasingly becoming intelligent, high-speed and automated. In all kinds of mechanical equipment, not only various parts of the equipment are closely related, but also different equipments are closely related, and finally a series of complex production systems are formed. An advanced fault diagnosis technology is adopted in the production process, and inspection and maintenance of mechanical equipment are included in the production process, so that the condition of the mechanical equipment can be predicted, the service time of the equipment can be prolonged, and the occurrence of catastrophic accidents can also be avoided. From a point of view, huge economic benefits are indirectly brought to enterprises.

The commonly used fault detection method is based on vibration. However, in many practical production environments, due to the limitations of working conditions or the accuracy of the equipment, mounting of sensors receiving vibration signals cannot actually be realized. Moreover, in the working environment of high pressure, high temperature, high load, high humidity or high corrosion, the vibration signals received by the sensors do not only contain the information of devices, but also contain a lot of interference information. It has become a relatively novel solution for a diagnosis technology to analyze the working state of the mechanical equipment by acquiring sound signals during the operation of the mechanical equipment through a microphone array. This further solves the problem that the sensors are inconvenient to place and diagnosis results are affected by the working environment. At the same time, improvement from analysis of the vibration signals to the analysis of the sound signals does not require too much mechanical professional knowledge and empirical judgement. At the same time, the entry level of a fault diagnosis technology is reduced at one level, and the limitations are also broken.

A neural network has a good data fitting function, which is beneficial to deal with complex problems such as multivariable problems, nonlinear problems and strong coupling problems. However, the current fault identifying method based on a neural network does not combine fault identification and fault location. Estimated fault positions are relatively stationary. In addition, for the current methods, classifiers are used to estimate the possibility of faults from a fixed angle, resulting in limited accuracy of fault signal location.

SUMMARY OF THE INVENTION

Aiming at the limited accuracy of fault signal location caused by the fault signal location and identification of industrial equipment doped with interference information in the prior art, the problem to be solved by the invention is to provide a fault signal locating and identifying method of industrial equipment based on a microphone array, so that the fault signal location has high accuracy.

In order to solve the technical problem, the fault signal locating and identifying method of industrial equipment based on the microphone array according to the present invention comprises the following steps:

1) Acquiring sound signals, and dividing the acquired signals into a training set, a verifying set and a test set;
2) Performing feature extraction using a feature extraction module on the sound signals in the training set, and performing a discrete Fourier transformation on the sound signals to extract a phase spectrogram and an amplitude spectrogram of a spectrogram;
3) Sending an output of the feature extraction module, as an input, to a convolutional neural network (CNN), and in each layer of the CNN, learning a translation invariance in the spectrogram by using a 2D CNN;
4) In between layers of the CNN, normalizing the output by using a batch normalization, and reducing a dimension by using a maximum pooling layer along a frequency axis;
5) Sending an output from the layers of the CNN to layers of a recurrent neural network (RNN) so as to learn time context information of audio signals;
6) Inputting a full connection layer comprising D nodes, and using a linear activation function;
7) Inputting an output of the full connection layer to two parallel full connection layer branches for fault identification and fault location, respectively; and
8) Verifying performance indexes of a network model by the verifying set, and verifying generalization ability of the network model by the test set.

In step 4), the reducing the dimension by using the maximum pooling layer along the frequency axis comprises the following steps:

401) Dividing an output result of a previous layer into blocks according to a size of a pooling filter, and selecting a maximum value of each block to represent a feature value;
402) performing average pooling on the divided blocks, and taking an average value of the blocks as the feature value; and
403) Calculating the output result of the pooling layer by the following formula:

$$O = \frac{I - P_s}{S} + 1$$

wherein O is a size of an output image, I is a size of an input image, $P_s$ is a size of the pooling layer, and S is a moving step size.

In step 5), the sending the output from the layers of the CNN to layers of the RNN so as to learn the time context information of the audio signals comprises the following steps:

501) Remodeling the dimension outputted by the CNN into a T frame sequence with a length of 2B feature vectors, and sending the T frame sequence to the layers of the RNN to learn the time context information of the audio signals; and
502) Selecting a long-term and short-term memory (LSTM) network by the layers of the RNN, wherein each layer of the LSTM network contains C nodes and uses a tanh activation function, at this time, the dimension is adjusted from (T×2×B) to (T×C), T is a length of a feature sequence frame, B is the number of convolution kernels, and C is the number of nodes in each layer of the LSTM network.

In step 7), the inputting the output of the full connection layer to two parallel full connection layer branches specifically comprises the following step:

In a fault identification branch consisting of the full connection layer with a sigmoid activation function, and containing 2 nodes, each of which corresponds to two sounds in overlapping sound sources, two identifying sound categories simultaneously by using the sigmoid activation function.

In step 8), the verifying the performance indexes of the network model by the verifying set specifically comprises the following steps:

801) Performing a DOA error calculation by using the following formula:

$$DOA_{error} = \frac{180}{\pi} \frac{1}{\sum_{t=1}^{T} D_P^t} \sum_{t=1}^{T} H(DOA_R^t, DOA_P^t)$$

wherein, $DOA_R^t$ represents all actual DOA values in a $t^{th}$ time frame, $DOA_P^t$ represents all predicted DOA values in the $t^{th}$ time frame, T represents a length of all time frames in the test set, and $D_P^t$ is the DOA number of $DOA_P^t$ in the $t^{th}$ time frame; if $D_P^t$ represents the number of the predicted sound sources, that is, if the prediction result is a single sound source, then $D_P^t$ is 1; if the prediction result is an overlapping sound source, then $D_P^t$ is 2, H represents the Hungarian algorithm, and the smaller the DOA error, the higher the prediction accuracy of the network model;

802) Calculating a precision rate and a recall rate of classification indicators respectively by the following formulas:

$$P = \frac{TP}{TP + FP}$$
$$R = \frac{TP}{TP + FN}$$

wherein TP is the number of predicting positive samples as positive cases, FP is the number of predicting negative samples as positive cases, FN is the number of predicting positive samples as negative cases, and TN is the number of predicting negative samples as negative cases; and 803) Calculating a harmonic mean $F_1$ of the precision rate and the recall rate, which is between 0 and 1, wherein the larger the value, the better the identification performance of the network model, and the formula for calculating $F_1$ is:

$$F_1 = \frac{2\sum_{t=1}^{T} TP(t)}{2\sum_{t=1}^{T} TP(t) + \sum_{t=1}^{T} FP(t) + \sum_{t=1}^{T} FN(t)}$$

wherein TP(t) is the number of sound categories that are active in both an actual operation and a predicting operation at the $t^{th}$ time frame, and FP(t) is the number of sound categories that are active in the predicting operation but inactive in the actual operation at the $t^{th}$ time frame; FN(t) represents the number of the sound categories that are inactive in the predicting operation but active in the actual operation; and T represents a total time frame length on the test set.

The method has the following beneficial effects and advantages:

1. A non-contact method based on audio signals is adopted rather than a vibration-based contact method, which is less restricted by environment and contact; a regression algorithm is adopted for location, which has a higher resolution than a conventional classifier method, fault location and fault identification branches run in parallel, and identification and location are performed synchronously to obtain results simultaneously, thereby improving the operating efficiency.

2. The method of the invention builds a convolutional recurrent neural network by connecting the CNN and the RNN in series, and uses the CNN to learn the spectral structure information of sound, and the RNN to learn time context information. As such, dynamic fault location and tracking are achieved, and the location accuracy is much higher than a CNN model. For multiple fault data sets, an improved convolutional recurrent neural network is designed to identify and locate multiple faults, and predict the respective DOA of overlapping faults on each time frame.

3. For overlapping fault scenarios containing more fault categories, according to the method, parameters such as the number of fault categories of the convolutional recurrent neural network model only need to be adjusted, allowing seamless integration into wider fault location tasks. A regression approach adopted to predict the DOA of faults based on the neural network has the advantage that the network is not limited to a set of DOA angles and can be performed as a high-resolution continuous DOA estimator.

DETAILED DESCRIPTION OF THE PREFERRED EMBODIMENT

The invention will be further described below with reference to the accompanying drawings.

Figure 1:
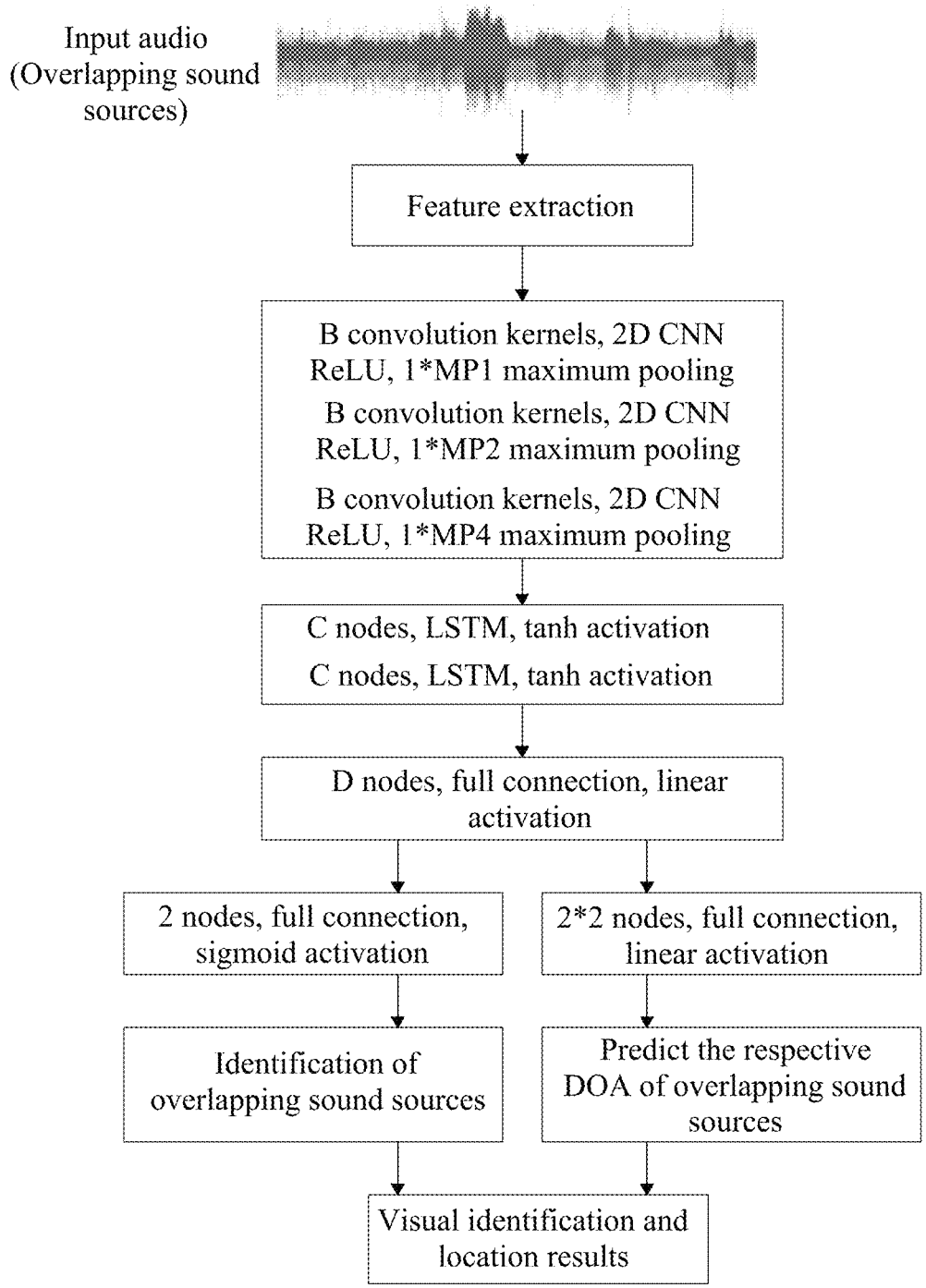
FIG. 1 illustrates a flow chart of a multi-fault locating and identifying method based on a neural network of the invention.

As shown in FIG. 1, the invention provides a fault signal locating and identifying method of industrial equipment based on a microphone array. The method comprises: connecting CNN and RNN in series, using the CNN to extract the spectral information of sound, and then using features as the input of the RNN for further time modeling, which improves the location accuracy compared with separate calculation. At the same time, a fault identification branch is added to realize identification and location of multiple faults, and identification and location are performed simultaneously, thereby having high operating efficiency.

The method comprises the following steps:

1) Acquiring sound signals, and dividing the acquired signals into a training set, a verifying set and a test set;
2) Performing feature extraction using a feature extraction module on the sound signals in the training set, and performing a discrete Fourier transformation on the sound signals to extract a phase spectrogram and a amplitude spectrogram of a spectrogram;
3) Sending an output of the feature extraction module, as an input, to a convolutional neural network (CNN), and in each layer of the CNN, learning a translation invariance in the spectrogram by using a 2D CNN;
4) In between layers of the CNN, normalizing the output by using a batch normalization, and reducing a dimension by using a maximum pooling layer along a frequency axis;
5) Sending an output from the layers of the CNN to layers of a recurrent neural network (RNN) so as to learn time context information of audio signals;
6) Inputting a full connection layer comprising D nodes, and using a linear activation function;
7) Inputting an output of the full connection layer to two parallel full connection layer branches for fault identification and fault location, respectively; and
8) Verifying performance indexes of a network model by the verifying set, and verifying generalization ability of the network model by the test set.

In step 1), an established coordinate system lies in that a sound source plane is an XOY plane, and a projection point of the microphone array on the XOY plane is the coordinate origin O, and a space rectangular coordinate system O-XYZ is established. The center of an umbrella array is the location of a webcam, and the webcam is used for capturing video data of the movement of a target sound source. The plane XOY where the sound source is located is parallel to an array plane, and the two planes are coaxial.

Different sound signals are played at different positions at the same time. The number of microphone array channels K is set as 16, audio sampling frequency f is set as 12800 Hz, video frames per second FPS of the webcam is set as 25, the acquisition is started, and the acquisition time is 300 seconds. At this time, a TDMS file contains two parts of audio data and video data.

The acquired sound signals are divided into a training set, a verifying set and a test set which are independent of each other.

In step 2), for each channel signal in the audio signals of the K channels, a Hamming window with a length of M=1024 and a 50% overlap is adopted to intercept the signals, and a discrete Fourier transformation is performed to extract a phase spectrogram and an amplitude spectrogram of a spectrogram. M/2 positive frequency parts containing fundamental frequency and harmonics are adopted as separate features. The output of a feature extraction module is a feature sequence of T frames with a dimension of T×M/2×(2K), wherein the 2K dimension consists of K-dimension amplitude components and K-dimension phase components.

In step 3), the CNN is specifically: the main function of a convolution layer is to perform a convolution operation on a feature map outputted by the previous layer and the convolution kernels, and the result is used as an output of the layer. The size of the convolution kernels is 3×3, the number is B, the convolution kernels act along a time-frequency-channel axis, and the size of the output image after the convolution operation is:

$$O = \frac{I - K + 2P}{S} + 1$$

wherein O is a size of an output image, I is a size of an input image, K is a size of the convolution kernels, S is a moving step size of the convolution kernels, and P represents padding number. The output of each layer of the CNN is activated by using ReLU. The ReLU formula is:

$$y = \max(0, x)$$

The convolution kernels act along the time-frequency-channel axis, and the ReLU is used to activate the output of each layer of the CNN.

In step 4), the reducing the dimension by using the maximum pooling layer along the frequency axis comprises:

401) Dividing an output result of the last layer into blocks according to the size of a pooling filter, and selecting the maximum value of each block to represent a feature value;
402) Performing average pooling on the divided blocks, and taking an average value of the blocks as the feature value; and
403) Calculating the output result of the pooling layer by the following formula:

$$O = \frac{I - P_s}{S} + 1$$

wherein O is a size of an output image, I is a size of an input image, $P_s$ is a size of the pooling layer, and S is a moving step size.

The pooling layer can greatly reduce a parameter matrix, thereby reducing the complexity of model training, then reducing information redundancy, and preventing model overfitting.

In between the layers of the CNN, the output is normalized by using a batch normalization, the feature sequence length containing T frames remains unchanged, and when the maximum pooling value of each layer is (8, 8, 4), the last layer of the CNN, containing B convolution kernels, is followed by the output of T×2×B dimension, wherein the frequency dimension reduced to 2 is the result of maximum pooling. In this way, after a spectrogram tensor (T×M/2×2K) passes through the 3 layers of the CNN, the dimension is reduced to T×2λB.

The sequence length T and the maximum pooling value of the CNN respectively change the value of the parameter under a control variable method, the change of DOA error is observed, and the value corresponding to the minimum DOA error is taken. The relationship between the sequence length T and the DOA error is shown as Table 1. The relationship between the maximum pooling value of the CNN and the DOA error is shown as Table 2.

Table 1 shows the effect of the feature sequence length on the DOA error:

| Experiment | Feature sequence length | DOA error |
|---|---|---|
| 1 | 16 | 2.27 |
| 2 | 32 | 1.62 |
| 3 | 64 | 1.91 |
| 4 | 128 | 2.38 |
| 5 | 256 | 2.53 |

It can be seen that when the feature sequence length T is 32, the DOA error is the smallest.

Table 2 shows the effect of the maximum pooling value on the DOA error:

| Experiment | Maximum pooling value of each layer of CNN | DOA error |
|---|---|---|
| 1 | (8, 2, 2) | 4.73 |
| 2 | (8, 2, 4) | 4.24 |
| 3 | (8, 2, 8) | 2.76 |
| 4 | (8, 4, 2) | 4.15 |
| 5 | (8, 4, 4) | 2.52 |
| 6 | (8, 4, 8) | 1.92 |
| 7 | (8, 8, 2) | 2.53 |
| 8 | (8, 8, 4) | 1.62 |
| 9 | (8, 8, 8) | 2.73 |

When the maximum pooling values of the three layers of the CNN are 8, 8 and 4, respectively, the DOA error predicted by the convolutional recurrent neural network is the smallest.

In step 5), sending the output from the layers of the CNN to layers of the RNN so as to learn the time context information of the audio signals comprises the following steps:

501) Remodeling the dimension outputted by the CNN into a T frame sequence with a length of 2B feature vectors, and sending the T frame sequence to the layers of the RNN to learn the time context information of the audio signals; and 502) Selecting a long-term and short-term memory (LSTM) network by the layers of the RNN, wherein each layer of the LSTM network contains C nodes and uses a tanh activation function, at this time, the dimension is adjusted from (T×2×B) to (T×C), T is a length of a feature sequence frame, B is the number of convolution kernels, and C is the number of the LSTM network nodes in each layer;

Selecting the number of the layers of the RNN and the number of the layers of the CNN is based on calculation of the DOA error in different situations, and the smallest DOA error is taken. The relationship between the number of layers of the CNN-RNN network and the DOA is shown as Table 3.

Table 3 shows the effect of the number of layers of the RNN network and the number of the layers of the CNN network on the DOA error:

| Experiment | The number of layers of the CNN-RNN network | DOA error |
|---|---|---|
| 1 | 0CNN-1LSTM | 6.48 |
| 2 | 0CNN-2LSTM | 5.54 |
| 3 | 0CNN-3LSTM | 5.74 |
| 4 | 1CNN-0LSTM | 6.43 |
| 5 | 1CNN-1LSTM | 5.42 |
| 6 | 1CNN-2LSTM | 5.21 |
| 7 | 1CNN-3LSTM | 6.03 |
| 8 | 2CNN-0LSTM | 4.71 |
| 9 | 2CNN-1LSTM | 4.07 |
| 10 | 2CNN-2LSTM | 3.82 |
| 11 | 2CNN-3LSTM | 3.29 |
| 12 | 3CNN-0LSTM | 3.13 |
| 13 | 3CNN-1LSTM | 2.17 |
| 14 | 3CNN-2LSTM | 1.62 |
| 15 | 3CNN-3LSTM | 2.48 |
| 16 | 4CNN-1LSTM | 2.94 |
| 17 | 4CNN-2LSTM | 2.53 |

According to the above table, it can be seen that the effect is the best when 3 layers of the CNN and 2 layers of the LSTM network are used.

Selecting the number of nodes in the layers of the RNN network and the layers of the CNN network is also based on the calculation of DOA errors with different numbers of nodes when other variables are fixed, and the number of the nodes corresponding to the smallest DOA error is selected. The relationship between the number of nodes and the DOA error is shown as Table 4.

Table 4 shows the effect of the number of nodes in the layers of the RNN network and the layers of the CNN network on the DOA error:

| Number of nodes of CNN | Number of nodes of RNN | DOA error |
|---|---|---|
| 32 | 32 | 2.81 |
| 32 | 64 | 1.17 |
| 32 | 128 | 2.71 |
| 64 | 32 | 4.01 |
| 64 | 64 | 2.43 |
| 64 | 128 | 1.62 |
| 128 | 32 | 2.43 |
| 128 | 64 | 2.11 |
| 128 | 128 | 3.03 |

When the number of the nodes of each layer of the CNN is 32, and the number of the nodes of the RNN is twice that of the CNN, the DOA error is the smallest. The value is taken as the number of the nodes of the CNN-RNN network.

In step 6), the inputting the full connection layer specifically comprises the following steps:

The full connection layer connects the output values of previous full connection neurons to one neuron. Relying on a full connection neural network, the neuron is converted into a one-dimension output neuron, and the output formula is:

$$x_j^l = f(\sum_{i \in M_j} x_i^{l-1} W_{ij}^l + b_j^l)$$

wherein $x_j^l$ is the output value of the $j^{th}$ neuron in the $l^{th}$ layer, $x_i^{l-1}$ is the output of the $i^{th}$ neuron in the $(l-1)^{th}$ layer, as the input of the $l^{th}$ layer, $f(\bullet)$ represents the activation function, $M_j$ represents the set of input data of $l$ layer, $b_j^l$ represents the bias of the $j^{th}$ neuron in the $l^{th}$ layer and $W_{ij}^l$ represents a connection weight of the $j^{th}$ neuron of the $l^{th}$ layer and the $i^{th}$ neuron of the input.

After through the full connection layer, the dimension of the data is adjusted to T×D.

The fault identification branch in step 7) consists of a full connection layer with a sigmoid activation function, and contains 2 nodes, each node corresponds to fault signals of different types, and two sound categories can be identified simultaneously by using the sigmoid activation function. The full connection layer in the fault location branch contains 2×2 nodes, corresponding to the azimuth and elevation angles of the two sound sources, respectively, and uses a linear activation function.

In step 8), DOA error calculation is performed by using the following formula:

$$DOA_{error} = \frac{180}{\pi} \frac{1}{\sum_{t=1}^{T} D_P^t} \sum_{t=1}^{T} H(DOA_R^t, DOA_P^t)$$

wherein, $DOA_R^t$ represents all actual DOA values in a $t^{th}$ time frame (actual DOA value represents the actual azimuth and elevation values of the sound source in the space), $DOA_P^t$ represents all predicted DOA values in the $t^{th}$ time frame, T represents a length of all time frames in the test set, and $D_P^t$ is the DOA number of $DOA_P^t$ in the $t^{th}$ time frame; if $D_P^t$ represents the number of the predicted sound sources, that is, if the prediction result is a single sound source, then $D_P^t$ is 1; if the prediction result is an overlapping sound source, then $D_P^t$ is 2, H represents the Hungarian algorithm, and the smaller the DOA error, the higher the prediction accuracy of the network model;

802) the precision rate and the recall rate of classification indicators are calculated respectively by the following formulas:

$$P = \frac{TP}{TP + FP}$$

$$R = \frac{TP}{TP + FN}$$

wherein TP (True Positive) is the number of predicting positive samples as positive cases, FP (False Positive) is the number of predicting negative samples as positive cases, FN (False Negative) is the number of predicting positive samples as negative cases, and TN (True Negative) is the number of predicting negative samples as negative cases; and 803) the harmonic mean $F_1$ (F-Score) of the precision rate and the recall rate is calculated, which is between 0 and 1, wherein the larger the value, the better the identification performance of the network model, and the formula for calculating $F_1$ is:

$$F_1 = \frac{2\sum_{t=1}^{T} TP(t)}{2\sum_{t=1}^{T} TP(t) + \sum_{t=1}^{T} FP(t) + \sum_{t=1}^{T} FN(t)}$$

wherein TP(t) is the number of sound categories that are active in the actual operation and the predicting operation at the $t^{th}$ time frame, and FP(t) is the number of the sound categories that are active in the predicting operation but inactive in the actual operation at the $t^{th}$ time frame; FN(t) represents the number of the sound categories that are inactive in the predicting operation but active in the actual operation; and T represents a total time frame length on the test set.

In the step, the DOA error is used as an evaluation index of the experiment. The DOA error is an average angle error between the predicted DOA and the actual DOA. $DOA_R^t$ represents all the actual DOA values in the $t^{th}$ time frame (the actual DOA value represents the actual azimuth angle and elevation angle values of the fault in space), $DOA_P^t$ represents all the predicted DOA values in the $t^{th}$ time frame, and T represents all the time frame lengths of the test set. H, the Hungarian algorithm, is used to solve the assignment problem, by using a spherical distance between the predicted and actual DOAs to predict pairwise cost between the predicted and actual DOAs, i.e. each predicted DOA is matched with the corresponding actual DOA. The calculation formula of the Hungarian algorithm is as follows:

$$H = \arccos(\sin\phi_P \sin\phi_R + \cos\phi_P \cos\phi_R \cos(\lambda_R - \lambda_P))$$

wherein the azimuth angle and the elevation angle of the actual DOA are recorded as $(\phi_R, \lambda_R)$, and the azimuth angle and the elevation angle of the predicted DOA are recorded as $(\phi_P, \lambda_P)$. The smaller the DOA error, the higher the prediction accuracy of the network model.

The data is divided into four independent parts, namely, split 1, split 2, split 3 and split 4, which are used as the training set, the verifying set and the test set, respectively, and cross training and verifying are performed on the network model. The verifying results are shown as Table 5:

Table 5 shows the results of the cross verifying set:

| Cross verifying | Training set | Verifying set | Test set | Fault identification ($F_1$ value) | Fault location (DOA error) |
|---|---|---|---|---|---|
| 1 | split 3, split 4 | split 2 | split 1 | 0.9738 | 3.18 |
| 2 | split 4, split 1 | split 3 | split 2 | 0.9737 | 3.05 |
| 3 | split 1, split 2 | split 4 | split 3 | 0.9798 | 2.62 |
| 4 | split 2, split 3 | split 1 | split 4 | 0.9723 | 2.92 |

The best parameter set is substituted into the network model. The training time of a set of cross-verifying models is about 2.5 hours, with a total of 658305 parameters. After the training is completed, only a very short time is needed on the test set. From the four cross verifying, the $F_1$ value of the fault identification branch is about 0.975, indicating that the provided convolutional recurrent neural network successfully identify faults with a high identification rate. When the training set is split 1 and split 2, and the verifying set is split 4, the lowest DOA error is achieved on the test set, that is, the average angle error between the predicted fault DOA in split 3 and the actual DOA is 2.62 degrees.

Figure 2A:
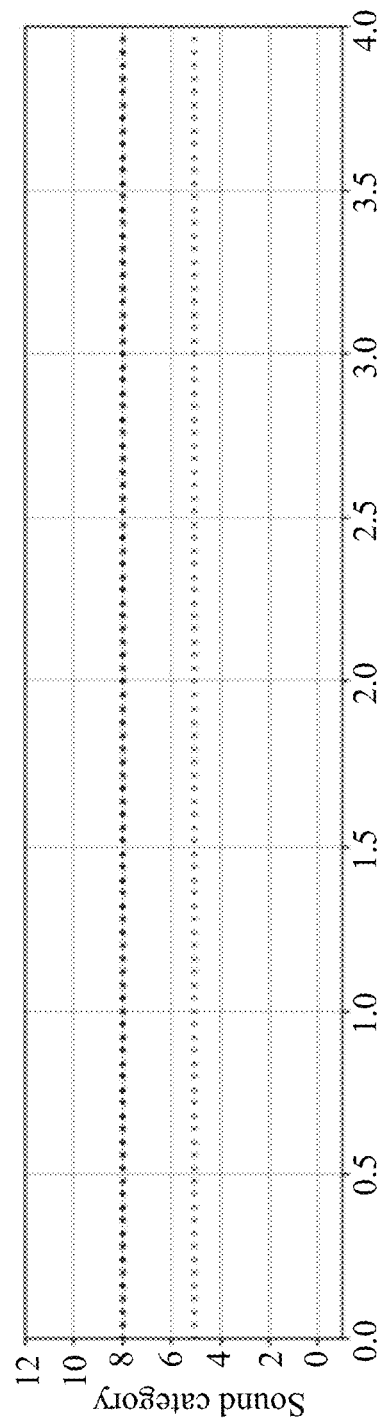
FIG. 2A illustrates a diagram of an actual overlapping sound source of multiple faults in the method of the invention.
Figure 2B:
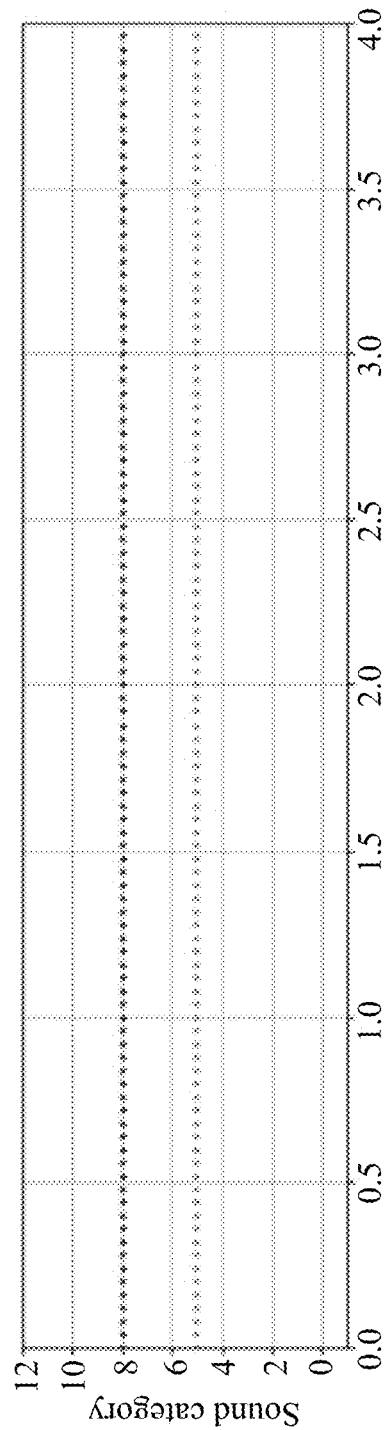
FIG. 2B illustrates a prediction diagram of an overlapping sound source of identification results of multiple faults in the method of the invention.
Figure 3A:
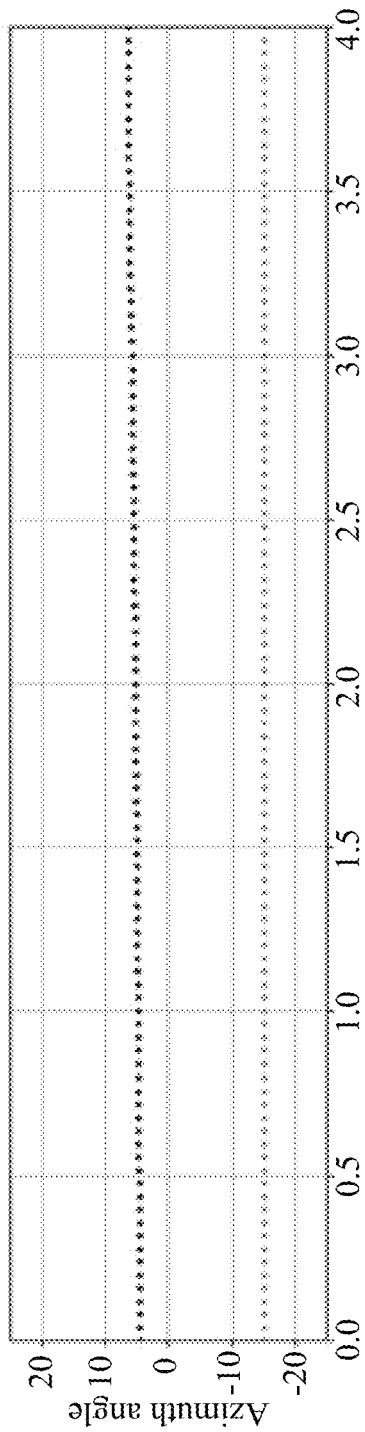
FIG. 3A illustrates an actual azimuth diagram in the method of the invention.
Figure 3B:
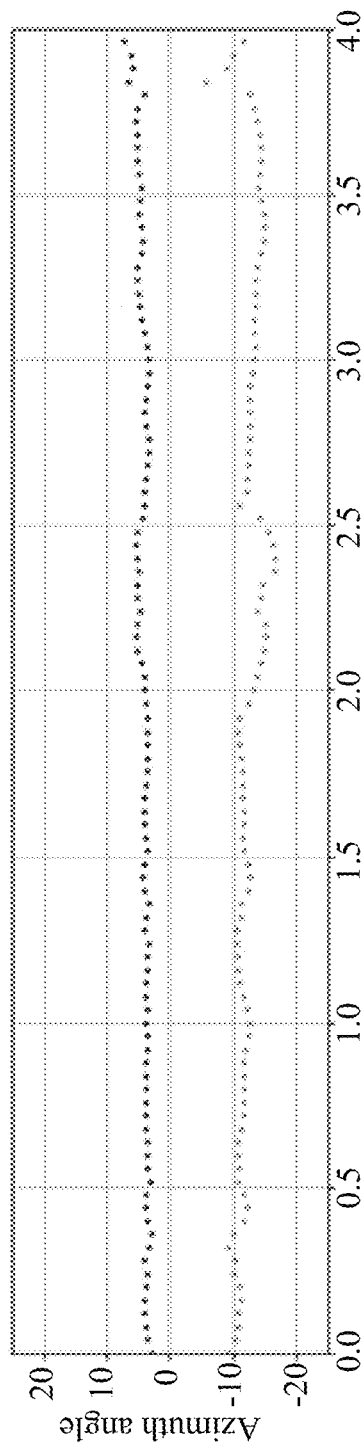
FIG. 3B illustrates a predicted azimuth diagram in the method of the invention.
Figure 4A:
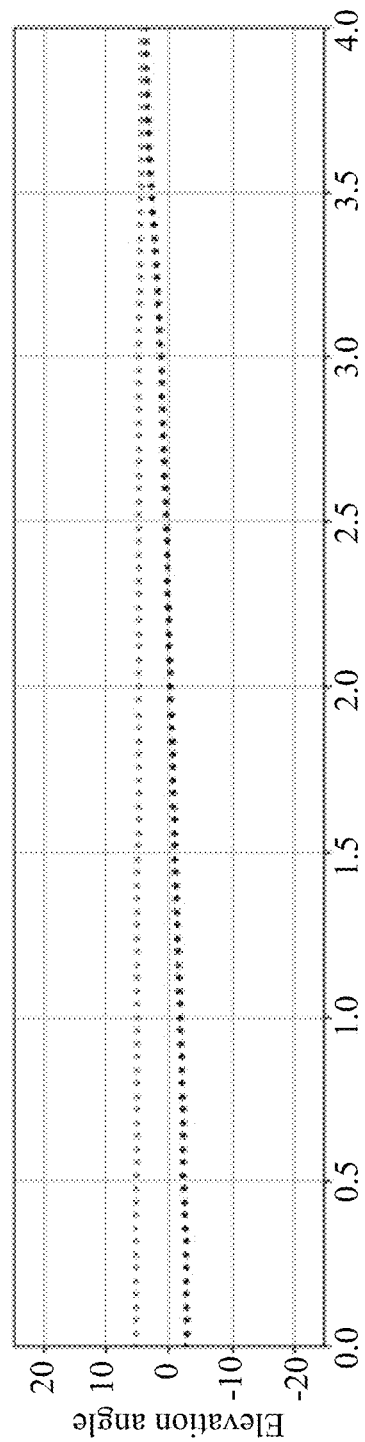
FIG. 4A illustrates an actual elevation angle diagram in the method of the invention.
Figure 4B:
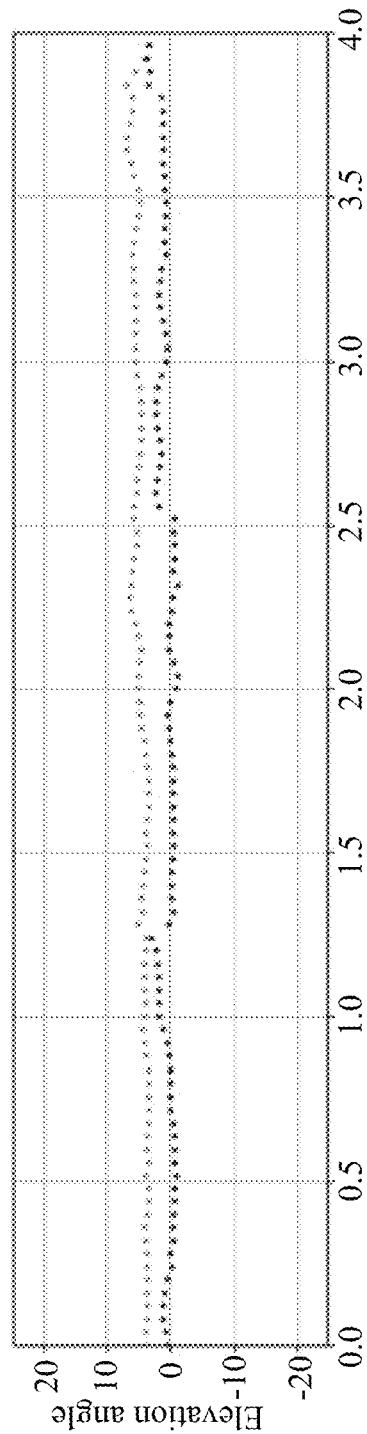
FIG. 4B illustrates a predicted elevation angle diagram in the method of the invention.

The results of fault identification are compared as shown as FIGS. 2A-2B. The comparison of the results of the orientation angle and the elevation angle in the location is shown as FIGS. 3A-3B and 4A-4B.

The method of the invention builds a convolutional recurrent neural network by connecting CNN and RNN in series, and uses the CNN to learn the spectral structure information of sound, and the RNN to learn time context information. The network achieves dynamic fault location and tracking, and the location accuracy is much higher than the CNN model.

For multiple fault data sets, an improved convolutional recurrent neural network is designed to identify and locate multiple faults, and predict the respective DOA of overlapping faults on each time frame. In addition, for overlapping fault scenarios containing more fault categories, parameters such as the number of fault categories of the convolutional recurrent neural network model only need to be adjusted, allowing seamless integration into wider fault location tasks. The present invention uses a regression approach to predict the DOA of faults based on a neural network, which has the advantage that the network is not limited to a set of DOA angles and can be performed as a high-resolution continuous DOA estimator.

What is claimed is:

1. A fault signal locating and identifying method of industrial equipment based on a microphone array, comprising the following steps:
   1) Acquiring sound signals through the microphone array, and dividing the acquired sound signals into a training set, a verifying set and a test set;
   2) Performing feature extraction using a feature extraction module on the sound signals in the training set, and performing a discrete Fourier transformation on the sound signals to extract a phase spectrogram and an amplitude spectrogram of a spectrogram;
   3) Sending an output of the feature extraction module, as an input, to a convolutional neural network (CNN), and in each layer of the CNN, learning a translation invariance in the spectrogram by using a 2D CNN;
   4) In between layers of the CNN, normalizing the output by using a batch normalization, and reducing a dimension by using a maximum pooling layer along a frequency axis;
   5) Sending an output from the layers of the CNN to layers of a recurrent neural network (RNN) so as to learn time context information of audio signals;
   6) inputting a full connection layer comprising D nodes, and using a linear activation function;
   7) inputting an output of the full connection layer to two parallel full connection layer branches for fault identification and fault location, respectively; and
   8) verifying performance indexes of a network model by the verifying set, and verifying generalization ability of the network model by the test set, by performing a DOA error calculation, determining a prediction accuracy of the network model, calculating a precision rate and a recall rate of classification indicators, and calculating a harmonic mean $F_1$ of the precision rate and the recall rate,
   wherein a convolutional recurrent neural network is built by connecting the CNN and the RNN in series, and the CNN is used to learn a spectral structure information of the sound signals, and the RNN is used to learn the time context information, thereby achieving fault location and identification.

2. The method according to claim 1, wherein in step 4), the reducing the dimension by using the maximum pooling layer along the frequency axis comprises the following steps:
   401) dividing an output result of a previous layer into blocks according to a size of a pooling filter, and selecting a maximum value of each block to represent a feature value;
   402) performing average pooling on the divided blocks, and taking an average value of the blocks as the feature value; and
   403) calculating the output result of the pooling layer by the following formula:

$$O = \frac{I - P_s}{S} + 1$$

wherein O is a size of an output image, I is a size of an input image, $P_s$ is a size of the pooling layer, and S is a moving step size.

3. The method according to claim 1, wherein in step 5), the sending the output from the layers of the CNN to the layers of the RNN so as to learn the time context information of the audio signals comprises the following steps:
   501) remodeling the dimension outputted by the CNN into a T frame sequence with a length of 2B feature vectors, and sending the T frame sequence to the layers of the RNN to learn the time context information of the audio signals; and
   502) selecting a long-term and short-term memory (LSTM) network by the layers of the RNN, wherein each layer of the LSTM network contains C nodes and uses a tanh activation function, at this time, the dimension is adjusted from (T×2×B) to (T×C), T is a length of a feature sequence frame, B is the number of convolution kernels, and C is the number of nodes in each layer of the LSTM network.

4. The method according to claim 1, wherein in step 7), the inputting the output of the full connection layer to two parallel full connection layer branches specifically comprises the following step:
   In a fault identification branch consisting of the full connection layer with a sigmoid activation function, and containing 2 nodes, each of which corresponds to two sounds in overlapping sound sources, identifying two sound categories simultaneously by using the sigmoid activation function.

5. The method according to claim 1, wherein in step 8), the verifying the performance indexes of the network model by the verifying set specifically comprises the following steps:
   801) performing a DOA error calculation by using the following formula:

$$DOA_{error} = \frac{180}{\pi} \frac{1}{\sum_{t=1}^{T} D'_P} \sum_{t=1}^{T} H(DOA'_R, DOA'_P)$$

wherein, $DOA'_R$ represents all actual DOA values in a $t^{th}$ time frame, $DOA'_P$ represents all predicted DOA values in the $t^{th}$ time frame, T represents a length of all time frames in the test set, and $D'_P$ is the DOA number of $DOA'_P$ in the $t^{th}$ time frame; if $D'_P$ represents the number of predicted sound sources, that is, if the prediction result is a single sound source, then $D'_P$ is 1; if the prediction result is an overlapping sound source, then $D'_P$ is 2, H represents the Hungarian algorithm, and the smaller the DOA error, the higher the prediction accuracy of the network model;
   802) calculating a precision rate and a recall rate of classification indicators respectively by the following formulas:

$$P = \frac{TP}{TP+FP}$$
$$R = \frac{TP}{TP+FN}$$

wherein TP is the number of predicting positive samples as positive cases, FP is the number of predicting negative samples as positive cases, FN is the number of predicting positive samples as negative cases, and TN is the number of predicting negative samples as negative cases; and 803) calculating a harmonic mean $F_1$ of the precision rate and the recall rate, which is between 0 and 1, wherein the larger the value, the better the identification performance of the network model, and the formula for calculating $F_1$ is:

$$F_1 = \frac{2\sum_{t=1}^{T} TP(t)}{2\sum_{t=1}^{T} TP(t) + \sum_{t=1}^{T} FP(t) + \sum_{t=1}^{T} FN(t)}$$

wherein TP(t) is the number of sound categories that are active in both an actual operation and a predicting operation at the $t^{th}$ time frame, and FP(t) is the number of the sound categories that are active in the predicting operation but inactive in the actual operation at the $t^{th}$ time frame; FN(t) represents the number of the sound categories that are inactive in the predicting operation but active in the actual operation; and T represents a total time frame length on the test set.

* * * * *